United States Patent
Chen et al.

(10) Patent No.: US 11,906,718 B2
(45) Date of Patent: Feb. 20, 2024

(54) WIDE-APERTURE SPHERICAL PRIMARY MIRROR OFF-AXIS AFOCAL OPTICAL SYSTEM

(71) Applicant: SOOCHOW UNIVERSITY, Suzhou (CN)

(72) Inventors: Xinhua Chen, Suzhou (CN); Yueping Lu, Suzhou (CN); Zhicheng Zhao, Suzhou (CN); Qiao Pan, Suzhou (CN); Weimin Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 16 days.

(21) Appl. No.: 17/908,113

(22) PCT Filed: Mar. 18, 2022

(86) PCT No.: PCT/CN2022/081568
§ 371 (c)(1),
(2) Date: Aug. 30, 2022

(87) PCT Pub. No.: WO2023/077712
PCT Pub. Date: May 11, 2023

(65) Prior Publication Data
US 2023/0280571 A1    Sep. 7, 2023

(30) Foreign Application Priority Data
Nov. 4, 2021  (CN) .......................... 202111301414.4

(51) Int. Cl.
*G02B 17/08*  (2006.01)
*G02B 13/18*  (2006.01)
*G02B 27/00*  (2006.01)

(52) U.S. Cl.
CPC ............. *G02B 17/08* (2013.01); *G02B 13/18* (2013.01); *G02B 27/0025* (2013.01); *G02B 17/0812* (2013.01)

(58) Field of Classification Search
CPC ...... G02B 5/08; G02B 17/00; G02B 17/0812; G02B 17/002; G02B 17/004;
(Continued)

(56) References Cited

U.S. PATENT DOCUMENTS

| | | | |
|---|---|---|---|
| 5,153,772 A | 10/1992 | Kathman et al. | |
| 5,825,553 A | 10/1998 | Chen | |
| 9,482,853 B2 * | 11/2016 | Sitter, Jr. | ................ G01S 3/781 |

FOREIGN PATENT DOCUMENTS

| | | |
|---|---|---|
| CN | 106383401 A | 2/2017 |
| CN | 110515189 A | 11/2019 |
| CN | 114047618 A | 2/2022 |

* cited by examiner

*Primary Examiner* — Stephone B Allen
*Assistant Examiner* — Tamara Y. Washington
(74) *Attorney, Agent, or Firm* — SZDC Law PC

(57) ABSTRACT

The invention provides a wide-aperture spherical primary mirror off-axis afocal optical system, including a primary mirror, a secondary mirror and an aberration compensation mirror group. The primary mirror is a spherical reflector, the secondary mirror are higher-order aspherical reflectors. The primary mirror and the secondary mirror form an off-axis two-mirror system to compress the beam aperture. The aberration compensation mirror group is a coaxial reflective system that is used off-axis. The aberration compensation mirror group has focal power to produce compensation aberrations. The incident beam passes through and is reflected by the primary mirror and secondary mirror sequentially and enters the aberration compensation mirror group thereafter. A spherical reflector is used as the primary mirror, which significantly reduces the development and (Continued)

manufacture cost of the system, and an aberration compensation mirror group is used off-axis to correct residual aberration in the system, which effectively improves imaging quality of the system.

6 Claims, 4 Drawing Sheets

(58) Field of Classification Search
CPC .... G02B 17/006; G02B 17/02; G02B 17/023; G02B 13/18; G02B 27/0025
USPC .......................................... 359/708, 726–735
See application file for complete search history.

WIDE-APERTURE SPHERICAL PRIMARY MIRROR OFF-AXIS AFOCAL OPTICAL SYSTEM

This application is the National Stage Application of PCT/CN2022/081568, filed on Mar. 18, 2022, which claims priority to Chinese Patent Application No. 202111301414.4, filed on Nov. 4, 2021, which is incorporated by reference for all purposes as if fully set forth herein.

FIELD OF THE INVENTION

The present invention relates to the technical field of optical imaging, and more particularly to a wide-aperture spherical primary mirror off-axis afocal optical system.

DESCRIPTION OF THE RELATED ART

Afocal optical systems are widely used in laser system, space optics and other fields. Depending on the configuration of the structure, there are three categories of afocal optical systems: reflective systems, refractive systems and catadioptric systems. For wide-aperture afocal systems, the reflective structure is usually adopted, and the reflector in the system is usually aspheric. U.S. patent US20100202073 proposed a coaxial three-mirror biased-field afocal system with an ellipsoidal primary mirror and a double curvature secondary mirror, but with occlusion in the system. U.S. Pat. No. 4,804,258 proposes a four-mirror afocal optical system, in which all four reflectors have quadric curved surfaces. U.S. Pat. No. 5,173,801 proposes a three-mirror afocal system with wide field of view, in which all three reflectors have quadric curved surfaces. U.S. Pat. No. 9,482,853 proposes a four-mirror afocal system, in which all three reflectors have higher-order aspheric surfaces. Us patent US20200292811 proposes a five-mirror afocal system, in which the reflectors are aspheric. Chinese patent CN101510006 proposes an off-axis three-mirror afocal system, in which the reflectors are aspheric. In the article "Design of catadioptric continuous zoom beam expander system", an afocal system with parabolic primary mirror and spherical secondary mirror is proposed, and a meniscus lens is used to correct aberration in the system.

To sum up, off-axis afocal systems often need to use multiple off-axis aspheric reflectors to meet the requirements of imaging quality. In the wide-aperture afocal system, the development cost of these aspheric reflectors is high, and the installation and adjustment are difficult, so their applications are limited.

SUMMARY OF THE INVENTION

The technical problem to be addressed by the present invention is to provide a wide-aperture spherical primary mirror off-axis afocal optical system of a simple structure, low cost and high imaging quality.

To address the problem mentioned above, the present invention provides a wide-aperture spherical primary mirror off-axis afocal optical system including:

- a primary mirror and a secondary mirror, the primary mirror being a spherical reflector, the secondary mirror being a higher-order aspherical reflector, the primary mirror and the secondary mirror forming an off-axis two-mirror system to compress the beam aperture; and
- an aberration compensation mirror group, the aberration compensation mirror group being a coaxial reflective system that is used off-axis, the aberration compensation mirror group having focal power to produce compensation aberrations;

Wherein an incident beam passes through the primary mirror and the secondary mirror and is reflected by the primary mirror and the secondary mirror sequentially, and enters the aberration compensation mirror group thereafter.

As a further improvement of the present invention, the focal length of the off-axis two-mirror system consisting of the primary mirror and the secondary mirror is f1, and the focal length of the aberration compensation mirror group is f2, and they satisfy the following relational expressions:

$$0.00006 \leq 1/f1 \leq 0.000097$$

$$0.02 \leq f2/f1 \leq 0.022.$$

As a further improvement of the present invention, the curvature radius of the primary mirror is R1, the curvature radius of the secondary mirror is R2, and the space between the primary mirror and the secondary mirror is d1, and they satisfy the following relational expressions:

$$-0.000338 \leq 1/R1 \leq -0.000331$$

$$0.24 \leq R2/R1 \leq 0.26$$

$$0.385 \leq d1/R1 \leq 0.396.$$

As a further improvement of the present invention, the curvature radius of the primary mirror is R1, and the space d2 between the secondary mirror and the aberration compensation mirror group satisfies the following relational expression:

$$0.376 \leq d2/R1 \leq 0.417.$$

As a further improvement of the present invention, the rise z of the secondary mirror satisfies the following expression:

$$z = (cr^2)/\{1+[1-(k+1)(c^2r^2)]^{1/2}\} + Ar^4 + Br^6 + Cr^8$$

where A, B and C are respectively quartic, sextic and octic aspherical coefficients, c is the curvature at the center of the optical surface, r is the vertical distance between a point on the aspherical curve and the optical axis, and the conic coefficient and aspherical coefficient of the secondary mirror 2 satisfy the following relational expressions:

$$9.5 \leq K \leq 11.96$$

$$1.22E{-}9 \leq A \leq 1.78E{-}9$$

$$1.10E{-}14 \leq B \leq 1.85E{-}14$$

$$2.20E{-}19 \leq C \leq 6.05E{-}19.$$

As a further improvement of the present invention, the aberration compensation mirror group includes a first lens, a second lens and a third lens that are sequentially arranged. The distance from the front surface of the first lens to the rear surface of the third lens is T, the focal length of the aberration compensation mirror group is f2 and they satisfy the following relational expression:

$$0.7 \leq f2/T \leq 1.2.$$

As a further improvement of the present invention, the aberration compensation mirror group includes a first lens, a second lens and a third lens that are sequentially arranged. The focal length of the first lens is f21, the curvature radius of the front surface of the first lens is R3, the curvature radius at the center of the rear surface of the first lens is R4, the on-axis thickness of the first lens is d3, the distance from the front surface of the first lens to the rear surface of the third lens is T, and they satisfy the following relational expressions:

$$-1.85 \leq f21/f2 \leq -1.75$$

$$1.13 \leq (R3+R4)/(R3-R4) \leq 1.45$$

$$0.09 \leq d3/T \leq 0.11.$$

As a further improvement of the present invention, the aberration compensation mirror group includes a first lens, a second lens and a third lens that are sequentially arranged. The focal length of the second lens is f22, the curvature radius of the front surface of the second lens is R5, the curvature radius of the rear surface of the second lens is R6, the on-axis thickness of the second lens is d5, the distance from the front surface of the first lens to the rear surface of the third lens is T, and they satisfy the following relational expressions:

$$-3.2 \leq f22/f2 \leq -1.15$$

$$-1 \leq (R5+R6)/(R5-R6) \leq 0.3$$

$$0.072 \leq d5/T \leq 0.074.$$

As a further improvement of the present invention, the aberration compensation mirror group includes a first lens, a second lens and a third lens that are sequentially arranged. The focal length of the third lens is f23, the curvature radius of the front surface of the third lens is R7, the curvature radius of the rear surface of the third lens is R8, the on-axis thickness of the third lens is d7, the distance from the front surface of the first lens to the rear surface of the third lens is T, and they satisfy the following relational expressions:

$$1.57 \leq f23/f2 \leq 1.63$$

$$0.41 \leq (R7+R8)/(R7-R8) \leq 0.90$$

$$0.13 \leq d7/T \leq 0.18.$$

As a further improvement of the present invention, the field angle of the wide-aperture spherical primary mirror off-axis afocal optical system is FOV, the beam compression ratio of the wide-aperture spherical primary mirror off-axis afocal optical system is Mag, and they satisfy the following relational expressions:

$$0.02° \leq FOV \leq 0.1°$$

$$4.0 \leq Mag \leq 6.0.$$

The present invention has the following beneficial effects:

In the wide-aperture spherical primary mirror off-axis afocal optical system of the present invention, a spherical reflector is used as the primary mirror, which significantly reduces the development and manufacture cost of the system, and an aberration compensation mirror group is used off-axis to correct residual aberration in the system, which effectively improves imaging quality of the system. Therefore, the present system has the advantages of a simple structure, low cost, high imaging quality and simple installation and adjustment.

The above description is only a summary of the technical solution of the present invention. In order to make the technical means of the present invention more apparent, it can be implemented according to the contents of this specification. In order to make the above and other objects, features and advantages of the present invention more obvious and understandable, preferred embodiments will be described in detail below with reference to the accompanying drawings.

Figure 1:
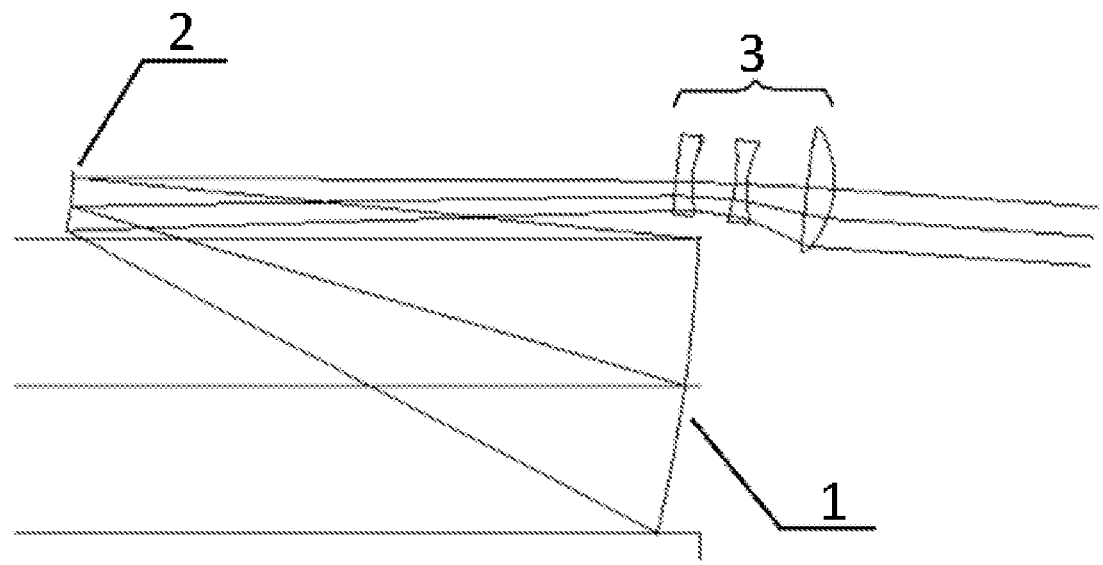
FIG. 1 is a schematic structural view of a wide-aperture spherical primary mirror off-axis afocal optical system according to a first embodiment of the present invention.

Reference numerals: 1 primary mirror; 2 secondary mirror; 3 aberration compensation mirror group; 31 first lens; 32 second lens; 33 third lens.

DETAILED DESCRIPTION OF THE PREFERRED EMBODIMENTS

The present invention will be further explained below with reference to the drawings and particular embodiments, so that those skilled in the art can better understand the present invention and implement it. However, the listed embodiments should not be taken as limitation of the present invention.

As shown in FIG. 1, a wide-aperture spherical primary mirror off-axis afocal optical system according to a first embodiment of the present invention includes:

a primary mirror 1 and a secondary mirror 2, the primary mirror 1 being a spherical reflector, the secondary mirror 2 being a higher-order aspherical reflector, the primary mirror 1 and the secondary mirror 2 forming an off-axis two-mirror system to compress the beam aperture; and an aberration compensation mirror group 3, the aberration compensation mirror group 3 being a coaxial reflective system that is used off-axis, the aberration compensation mirror group 3 having focal power to produce compensation aberrations.

An incident beam enters and is reflected by the primary mirror 1 and the secondary mirror 2 sequentially and enters the aberration compensation mirror group 3 thereafter.

In the wide-aperture spherical primary mirror off-axis afocal optical system of the present invention, a spherical reflector is used as the primary mirror, which significantly reduces the development and manufacture cost of the system, and an aberration compensation mirror group is used off-axis to correct residual aberration in the system, which effectively improves imaging quality of the system. Therefore, the present system has the advantages of a simple structure, low cost, high imaging quality and simple installation and adjustment.

Optionally, the focal length of the off-axis two-mirror system consisting of the primary mirror and the secondary mirror is f1, and the focal length of the aberration compensation mirror group is f2, and they satisfy the following relational expressions:

$0.00006 \leq 1/f1 \leq 0.000097$ $0.02 \leq f2/f1 \leq 0.022$.

Optionally, the curvature radius of the primary mirror is R1, the curvature radius of the secondary mirror is R2, and the space between the primary mirror and the secondary mirror is d1, and they satisfy the following relational expressions:

$-0.000338 \leq 1/R1 \leq -0.000331$ $0.24 \leq R2/R1 \leq 0.26$ $0.385 \leq d1/R1 \leq 0.396$.

Optionally, the curvature radius of the primary mirror is R1, and the space d2 between the secondary mirror and the aberration compensation mirror group satisfies the following relational expression:

$0.376 \leq d2/R1 \leq 0.417$.

Optionally, the rise z of the secondary mirror satisfies the following expression:

$z = (cr^2)/\{1+[1-(k+1)(c^2r^2)]^{1/2}\} + Ar^4 + Br^6 + Cr^8$ where A, B and C are respectively quartic, sextic and octic aspherical coefficients, c is the curvature at the center of the optical surface, r is the vertical distance between a point on the aspherical curve and the optical axis, and the conic coefficient and aspherical coefficient of the secondary mirror 2 satisfy the following relational expressions:

$9.5 \leq K \leq 11.96$ $1.22E-9 \leq A \leq 1.78E-9$ $1.10E-14 \leq B \leq 1.85E-14$ $2.20E-19 \leq C \leq 6.05E-19$.

Optionally, the aberration compensation mirror group includes a first lens, a second lens and a third lens that are sequentially arranged. The distance from the front surface of the first lens to the rear surface of the third lens is T, the focal length of the aberration compensation mirror group is f2 and they satisfy the following relational expression:

$0.7 \leq f2/T \leq 1.2$.

Optionally, the aberration compensation mirror group includes a first lens, a second lens and a third lens that are sequentially arranged. The focal length of the first lens is f21, the curvature radius of the front surface of the first lens is R3, the curvature radius at the center of the rear surface of the first lens is R4, the on-axis thickness of the first lens is d3, the distance from the front surface of the first lens to the rear surface of the third lens is T, and they satisfy the following relational expressions:

$-1.85 \leq f21/f2 \leq -1.75$ $1.13 \leq (R3+R4)/(R3-R4) \leq 1.45$ $0.09 \leq d3/T \leq 0.11$.

Optionally, the aberration compensation mirror group includes a first lens, a second lens and a third lens that are sequentially arranged. The focal length of the second lens is f22, the curvature radius of the front surface of the second lens is R5, the curvature radius of the rear surface of the second lens is R6, the on-axis thickness of the second lens is d5, the distance from the front surface of the first lens to the rear surface of the third lens is T, and they satisfy the following relational expressions:

$-3.2 \leq f22/f2 \leq -1.15$ $-1 \leq (R5+R6)/(R5-R6) \leq 0.3$ $0.072 \leq d5/T \leq 0.074$.

Optionally, the aberration compensation mirror group includes a first lens, a second lens and a third lens that are sequentially arranged. The focal length of the third lens is f23, the curvature radius of the front surface of the third lens is R7, the curvature radius of the rear surface of the third lens is R8, the on-axis thickness of the third lens is d7, the distance from the front surface of the first lens to the rear surface of the third lens is T, and they satisfy the following relational expressions:

$1.57 \leq f23/f2 \leq 1.63$ $0.41 \leq (R7+R8)/(R7-R8) \leq 0.90$ $0.13 \leq d7/T \leq 0.18$.

Optionally, the field angle of the wide-aperture spherical primary mirror off-axis afocal optical system is FOV, the beam compression ratio of the wide-aperture spherical primary mirror off-axis afocal optical system is Mag, and they satisfy the following relational expressions:

$0.02° \leq FOV \leq 0.1°$ $4.0 \leq Mag \leq 6.0$.

In the first embodiment, the operating wavelength is 1060 nm. The entrance aperture D of the wide-aperture spherical primary mirror off-axis afocal optical system is assumed to be 500 mm, specifying the range of input aperture of the system, so that this wide-aperture spherical primary mirror off-axis afocal optical system has wide-aperture characteristics. The field angle FOV of the wide-aperture spherical primary mirror off-axis afocal optical system is assumed to be 0.08°, which satisfies the relational expression of $0.02° \leq FOV \leq 0.1°$, specifying the range of visual field of the wide-aperture spherical primary mirror off-axis afocal optical system, so that it is applicable to scenarios such as laser focusing. The compression ratio Mag of the wide-aperture spherical primary mirror off-axis afocal optical system is assumed to be 4.9, which satisfies the relational expression of $4.0 \leq Mag \leq 6.0$, making it a medium ratio system.

Table 1 shows the specific design parameters of the wide-aperture spherical primary mirror off-axis afocal optical system according to the first embodiment of the present invention.

TABLE 1

| | | Curvature radius | Space | | K | A | B | C | Y- | X- |
|---|---|---|---|---|---|---|---|---|---|---|
| 1 | Sphere | −3000.00 | −1186.25 | REFL | | | | | | |
| 2 | Asphere | −732.19 | 1141.06 | REFL | 11.96 | 1.76E−09 | 1.80E−14 | 6.04E−19 | 420.29 | |

TABLE 1-continued

| | Curvature radius | Space | K | A | B | C | Y- | X- |
|---|---|---|---|---|---|---|---|---|
| 3 Sphere | 2949.94 | 30.00 | H-K9L | | | | 1.30 | −0.47 |
| 4 Sphere | 187.86 | 82.66 | | | | | −15.88 | −6.09 |
| 5 Sphere | −356.22 | 21.96 | H-K9L | | | | | |
| 6 Sphere | 212.87 | 113.61 | | | | | | |
| 7 Sphere | 1874.29 | 51.76 | H-K9L | | | | | |
| 8 Sphere | −189.43 | | | | | | | | wherein

Conic coefficient, K; Quartic aspherical coefficien, A; Sextic aspherical coefficien, B; Octic aspherical coefficient, C; X-inclination, Y-eccentricity.

In the first embodiment, the primary mirror 1 and the secondary mirror 2 form an off-axis two-mirror system without occlusion. Optionally, the primary mirror 1 is off-axis by the amount of 420.29 in the direction of the Y-axis, and the secondary mirror 2 is off-axis by the amount of −15.88 in the direction of the Y-axis. The secondary mirror 2 is also inclined about the X-axis by the amount of −0.47°. The off-axis two-mirror system consisting of the primary mirror 1 and the secondary mirror 2 has weak focal power. The focal length f1 of the off-axis two-mirror system is 10491, and the focal length f2 of the aberration compensation mirror group 3 is 215.631, and they satisfy the following relational expressions: $0.00006 \leq 1/f1 \leq 0.000097$ and $0.02 \leq f2/f1 \leq 0.022$. Within the range specified by these relational expressions, the primary mirror 1 and the secondary mirror 2 form a system of a long focal length for compression of the beam aperture. The aberration compensation mirror group 3 has a certain focal power to produce compensate aberration and improve the imaging quality.

In the first embodiment, the curvature radius R1 of the primary mirror 1 in the off-axis two-mirror system is assumed to be −3000 and satisfies the following relational expression: $-0.000338 \leq 1/R1 \leq -0.000331$. The curvature radius R2 of the secondary mirror 2 is assumed to be −732.19, the space d1 between the primary mirror 1 and the secondary mirror 2 is assumed to be 1186.25, and they satisfy the following relational expressions: $0.24 \leq R2/R1 \leq 0.26$ and $0.385 \leq d1/R1 \leq 0.396$. Within the range specified by these relational expressions, correction of aberrations in the system is facilitated and imaging quality is improved.

In the first embodiment, the space d2 between the secondary mirror 2 and the aberration compensation mirror group 3 is assumed to be 1141.06 and satisfies the following relational expression: $0.376 \leq d2/R1 \leq 0.417$. Within the range specified by this relational expression, correction of aberrations in the system and control of the length of the system are facilitated and sensitivity can be reduced.

In the first embodiment, the quadric curved surface coefficient K of the secondary mirror 2 is 11.96, the quartic curved surface coefficient A is 1.76E−9, the sextic curved surface coefficient B is 1.80E−14, and the octic curved surface coefficient C is 6.04E−19, and they satisfy the following relational expressions: $9.5 \leq K \leq 11.96$, $1.22E-9 \leq A \leq 1.78E-9$, $1.10E-14 \leq B \leq 1.85E-14$ and $2.20E-19 \leq C \leq 6.05E-19$. Within the range specified by these relational expressions, an aspherical coefficient is introduced by the secondary mirror, which facilitates significant reduction of the aberration in the system.

Figure 2:
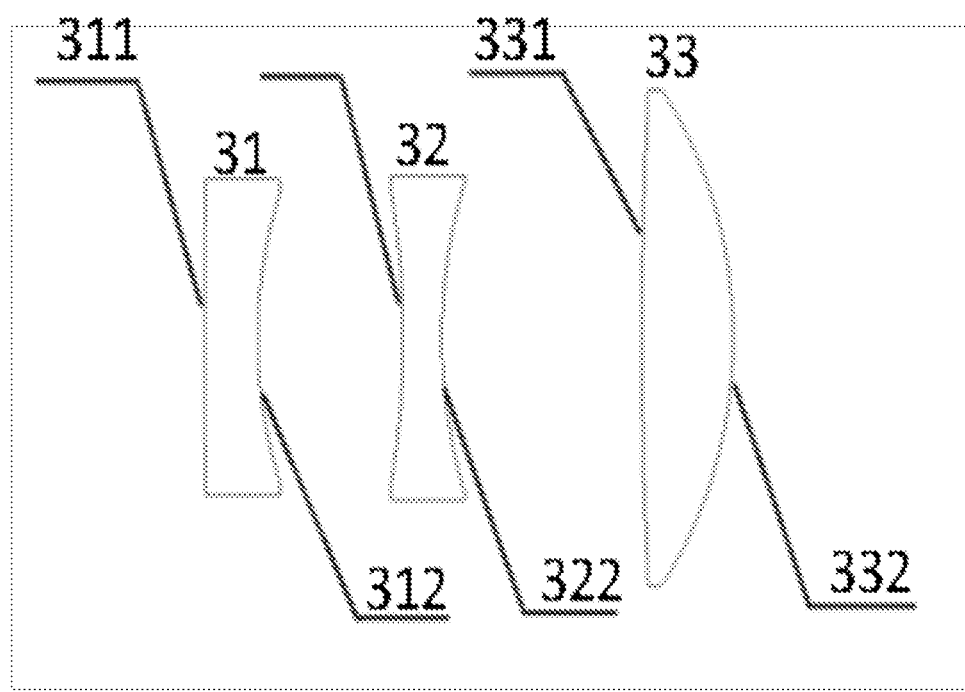
FIG. 2 is a schematic structural view of an aberration compensation mirror group according to the first embodiment of the present invention.

FIG. 2 shows a schematic structural view of an aberration compensation mirror group 3 according to the first embodiment of the present invention. The aberration compensation mirror group 3 includes a first lens 31, a second lens 32 and a third lens 33. The distance T from the front surface of the first lens 31 to the rear surface of the third lens 33 is 300 and satisfies the following relation expression: $0.7 \leq f2/T \leq 1.2$. Within the range specified by this relational expression, difficulty in manufacture of the three lenses in the aberration compensation mirror group 3 is reduced, the sensitivity is reduced and difficulty in installation and adjustment is reduced.

In the first embodiment, the aberration compensation mirror group 3 is used off-axis, having eccentricity in the direction of the Y-axis by an amount of −15.88 and inclination about the X-axis by an amount of −6.09° relative to the coordinate system of the secondary mirror 2. The space between the first lens 31 and the second lens 32 is 82.66 and 113.61.

In the first embodiment, the focal length f21 of the first lens 31 is −397.377, the surface 311 of the first lens 31 facing the secondary mirror 2 is a convex surface with a curvature radius R3 of 2949.94, the surface 312 of the first lens 31 facing the second lens 32 is a concave surface with a curvature radius R4 at the center of 187.86, the on-axis thickness d3 of the first lens 31 is 30, the distance T from the front surface of the first lens 31 to the rear surface of the third lens 33 is 300, and they satisfy the following relational expressions: $-1.85 \leq f21/f2 \leq -1.75$, $1.13 \leq (R3+R4)/(R3-R4) \leq 1.45$ and $0.09 \leq d3/T \leq 0.11$. By controlling the negative focal power of the first lens 31 within a reasonable range, correction of aberration in the optical system is facilitated. The shape of the first lens 31 is reasonably controlled so that a certain positive spherical aberration can be introduced by the first lens 31. By reasonably selecting the thickness of the lens, the weight of the system can be reduced while the machinability is ensured.

In the first embodiment, the focal length f22 of the second lens 32 is −259.58, the surface 311 of the second lens 32 facing the first lens 31 is a concave surface with a curvature radius R5 of −356.22, the surface 322 of the second lens 32 facing the third lens 31 is a concave surface with a curvature radius R6 of 212.88, and the on-axis thickness d5 of the second lens 32 is 21.96, and they satisfy the following relational expressions: $-3.2 \leq f22/f2 \leq -1.15$, $-1 \leq (R5+R6)/(R5-R6) \leq 0.3$ and $0.072 \leq d5/T \leq 0.074$. By controlling the negative focal power of the second lens 32 within a reasonable range, further correction of aberration in the optical system is facilitated. The shape of the second lens 32 is reasonably controlled so that a significant spherical aberration and partial coma aberration can be introduced by the first lens 32 and aberration in the system can be improved. By reasonably selecting the thickness of the lens, the weight of the system can be reduced while the machinability is ensured.

In the first embodiment, the focal length f23 of the third lens 33 is 342.39, the surface 331 of the third lens 33 facing the second lens 32 is a convex surface with a curvature radius R7 of 1874.29, the surface 332 of the third lens 33 facing the exit direction is a convex surface with a curvature radius R8 of −189.43, the on-axis thickness d7 of the third lens 33 is 51.7608, and they satisfy the following relational expressions: $1.57 \leq f23/f2 \leq 1.63$, $0.41 \leq (R7+R8)/(R7-R8) \leq 0.90$ and $0.13 \leq d7/T \leq 0.18$. The third lens 33 has positive focal power. The shape of the third lens 33 is reasonably controlled so that a negative spherical aberration and partial coma aberration can be introduced and aberration in the system can be further corrected. By reasonably selecting the thickness of the lens, the weight of the system can be reduced while the machinability is ensured.

Figure 3:
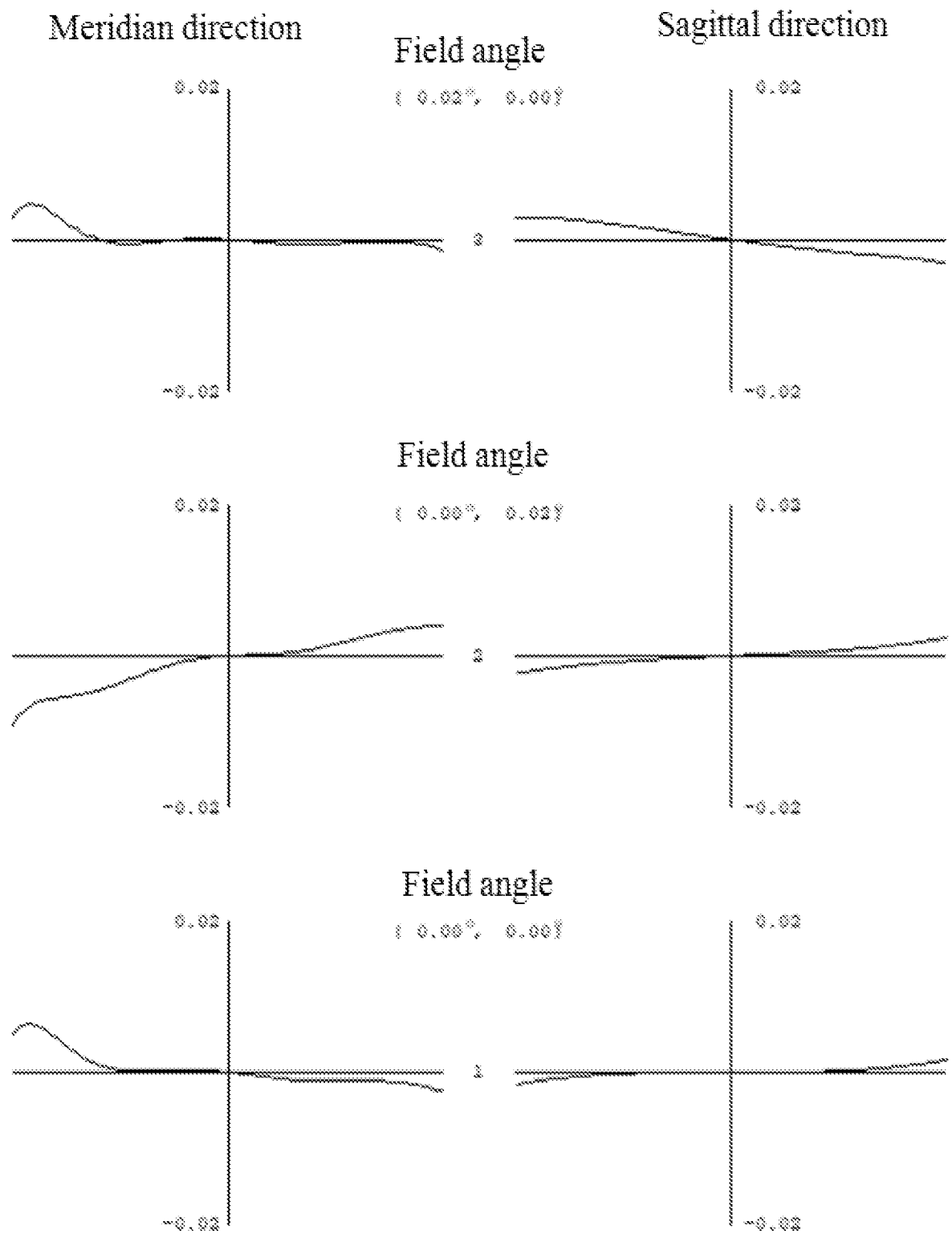
FIG. 3 is a ray aberration diagram according to the first embodiment of the present invention.

In the first embodiment, the imaging quality of the afocal system according to the present embodiment is evaluated by means of a ray aberration diagram. As this system is an afocal system, an ideal converging lens with a focal length of 500 mm is added in the exit beam for the purpose of evaluation. The ideal converging lens will not introduce any additional aberration. FIG. 3 is a ray aberration diagram according to the first embodiment.

Figure 4:
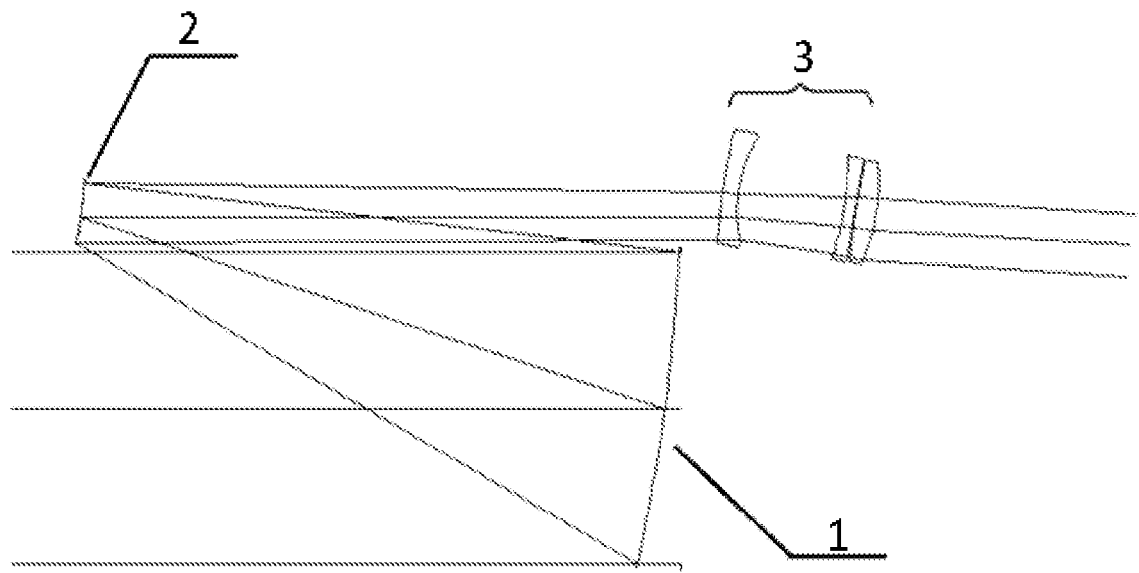
FIG. 4 is a schematic structural view of a wide-aperture spherical primary mirror off-axis afocal optical system according to a second embodiment of the present invention.

In the first embodiment, a quadratic curved surface is introduced in the transmissive compensation mirror group 3 so that the imaging quality of the system can be further increased. FIG. 4 is a structural optical path diagram of a wide-aperture spherical primary mirror off-axis afocal optical system according to a second embodiment of the present invention, in which the designations have the same meaning as in the first embodiment. Table 2 shows the specific design parameter according to the second embodiment of the present invention.

TABLE 2

| | | Curvature radius | Space | | K | A | B | C | Y | X |
|---|---|---|---|---|---|---|---|---|---|---|
| 1 | Sphere | −3000.00 | −1158.30 | REFL | | | | | | |
| 2 | Asphere | −752.34 | 1240.86 | REFL | 9.51 | 1.23E−09 | 1.15E−14 | 2.25E−19 | 435.58 | |
| 3 | Sphere | 1250.82 | 30.00 | H-K9L | | | | | 2.18 | −0.50 |
| 4 | Conics | 226.06 | 207.00 | | −1 | | | | −33.65 | −9.14 |
| 5 | Sphere | −496.13 | 22.00 | H-K9L | | | | | | |
| 6 | Sphere | 1844588.06 | 1.00 | | | | | | | |
| 7 | Sphere | 905.17 | 40.00 | H-K9L | | | | | | |
| 8 | Sphere | −351.61 | | | | | | | | | wherein,

Conic coefficient, K; Quartic aspherical coefficient, A; Sextic aspherical coefficien, B; Octic aspherical coefficient, C; X-inclination, Y-eccentricity.

Figure 5:
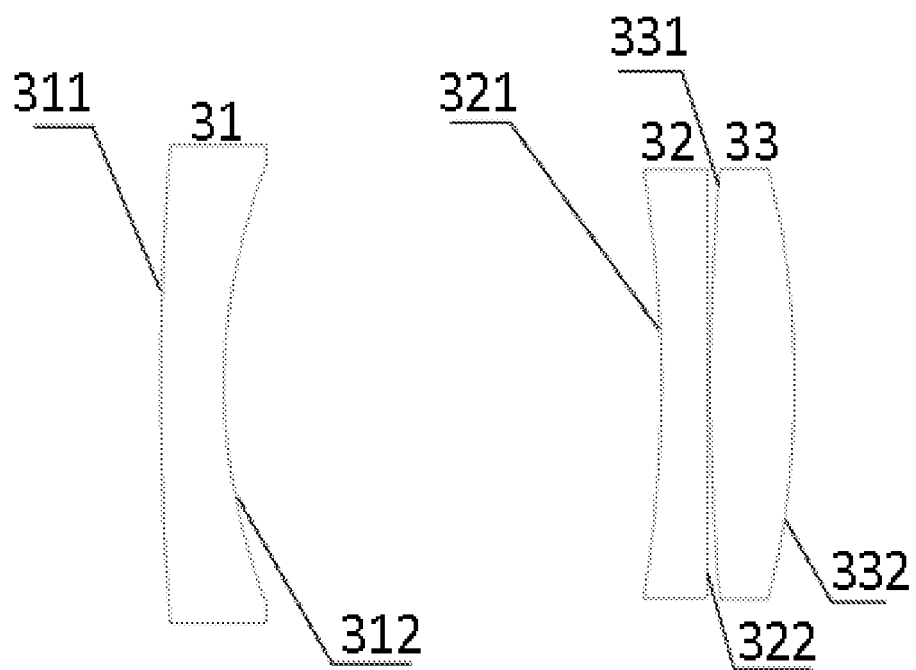
FIG. 5 is a schematic structural view of an aberration compensation mirror group according to the second embodiment of the present invention.

FIG. 5 is a structural optical path diagram of an aberration compensation mirror group according to the second embodiment, in which the first lens 31 and the second lens 32 are negative lenses and the third lens 33 is a positive lens.

In this embodiment, the surface 312 of the first lens 31 facing the second lens 32 is a parabolic surface, which facilitates further improvement of the imaging quality of the system.

Figure 6:
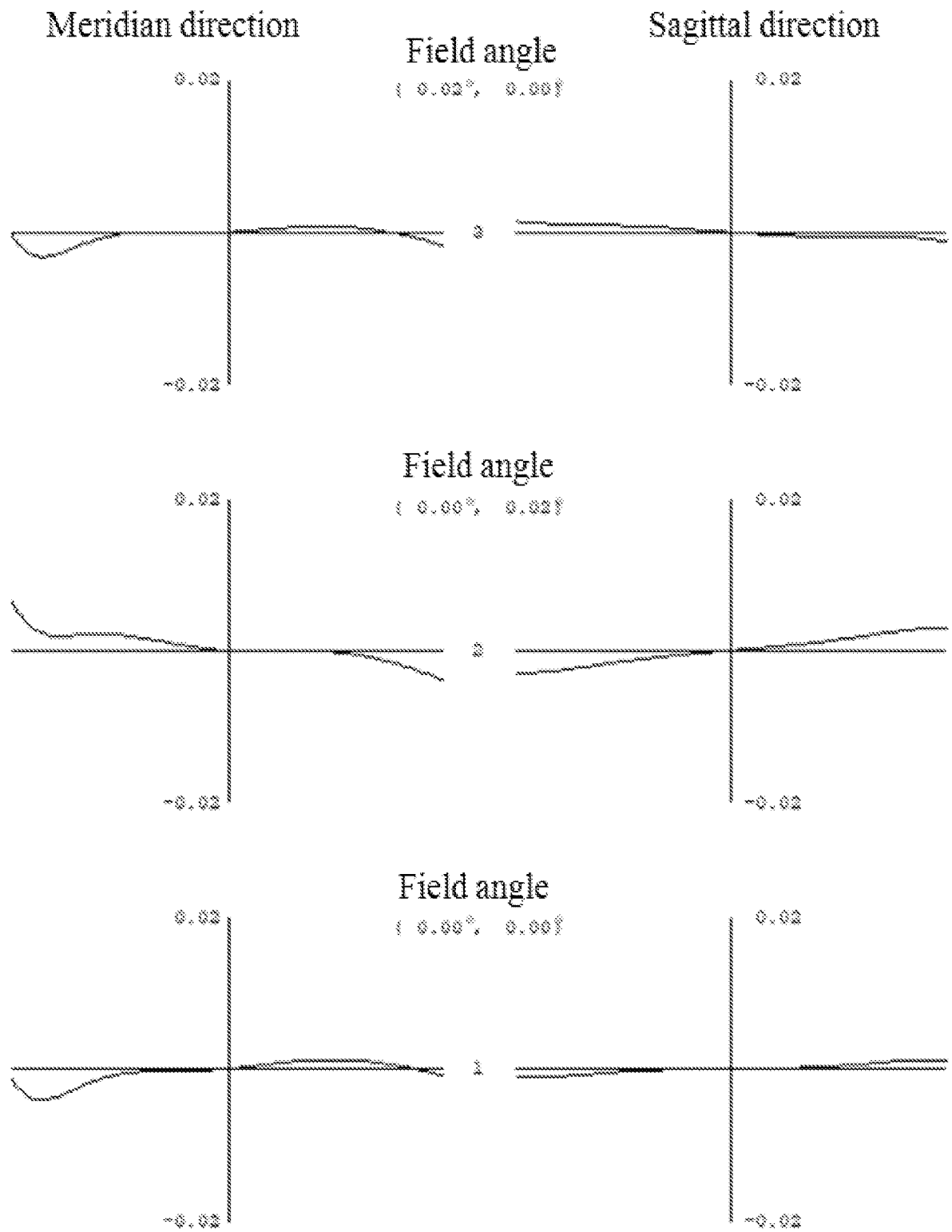
FIG. 6 is a ray aberration diagram according to the second embodiment of the present invention.

FIG. 6 is a ray aberration diagram according to the second embodiment. As this system is an afocal system, an ideal converging lens with a focal length of 500 mm is added in the exit beam for the purpose of evaluation. The ideal converging lens will not introduce any additional aberration.

The above embodiments are only preferred embodiments for fully explaining the present invention, and the scope of protection of the present invention is not limited thereto. Equivalent substitutions or changes made by those skilled in the art on the basis of the present invention shall fall within the scope of protection of the present invention. The scope of protection of the present invention is defined by the claims.

What is claimed is:

1. A wide-aperture spherical primary mirror off-axis afocal optical system comprising:
a primary mirror and a secondary mirror, the primary mirror being a spherical reflector, the secondary mirror being a higher-order aspherical reflector, the primary mirror and the secondary mirror forming an off-axis two-mirror system to compress a beam aperture; and
an aberration compensation mirror group, the aberration compensation mirror group being a coaxial reflective system that is used off-axis, the aberration compensation mirror group having focal power to produce compensation aberrations;
wherein an incident beam passes through and is reflected by the primary mirror and the secondary mirror sequentially and enters the aberration compensation mirror group thereafter,
wherein the aberration compensation mirror group includes a first lens, a second lens and a third lens that are sequentially arranged, a distance from a front surface of the first lens to a rear surface of the third lens is T, the focal length of the aberration compensation mirror group is f2 and they satisfy a relational expression of:

$0.7 \leq f2/T \leq 1.2$;

wherein a focal length of the first lens is f21, a curvature radius of a front surface of the first lens is R3, a curvature radius at a center of a rear surface of the first lens is R4, an on-axis thickness of the first lens is d3, a distance from a front surface of the first lens to a rear surface of the third lens is T, and they satisfy relational expressions of:

$-1.85 \leq f21/f2 \leq -1.75$ $1.13 \leq (R3+R4)/(R3-R4) \leq 1.45$ $0.09 \leq d3/T \leq 0.11$;

wherein a focal length of the second lens is f22, a curvature radius of the front surface of the second lens is R5, a curvature radius of a rear surface of the second lens is R6, an on-axis thickness of the second lens is d5, a distance from a front surface of the first lens to a rear surface of the third lens is T, and they satisfy relational expressions of:

$-3.2 \leq f22/f2 \leq -1.15$ $-1 \leq (R5+R6)/(R5-R6) \leq 0.3$ $0.072 \leq d5/T \leq 0.074$;

wherein a focal length of the third lens is f23, a curvature radius of a front surface of the third lens is R7, a curvature radius of a rear surface of the third lens is R8, an on-axis thickness of the third lens is d7, a distance from a front surface of the first lens to a rear surface of the third lens is T, and they satisfy relational expressions of:

$1.57 \leq f23/f2 \leq 1.63$ $0.41 \leq (R7+R8)/(R7-R8) \leq 0.90$ $0.13 \leq d7/T \leq 0.18.$ 2. The wide-aperture spherical primary mirror off-axis afocal optical system of claim 1, wherein a focal length of the off-axis two-mirror system consisting formed by the primary mirror and the secondary mirror is f1, and a focal length of the aberration compensation mirror group is f2, and they satisfy the following relational expressions:

$0.00006 \leq 1/f1 \leq 0.000097$ $0.02 \leq f2/f1 \leq 0.022.$

3. The wide-aperture spherical primary mirror off-axis afocal optical system of claim 1, wherein a curvature radius of the primary mirror is R1, a curvature radius of the secondary mirror is R2, and a space between the primary mirror and the secondary mirror is d1, and they satisfy the following relational expressions:

$-0.000338 \leq 1/R1 \leq -0.000331$ $0.24 \leq R2/R1 \leq 0.26$ $0.385 \leq d1/R1 \leq 0.396.$ 4. The wide-aperture spherical primary mirror off-axis afocal optical system of claim 1, wherein the curvature radius of the primary mirror is R1, and a space d2 between the secondary mirror and the aberration compensation mirror group satisfies the following relational expression:

$0.376 \leq d2/R1 \leq 0.417.$

5. The wide-aperture spherical primary mirror off-axis afocal optical system of claim 1, wherein a rise z of the secondary mirror satisfies the following expression:

$z = (cr^2)/\{1+[1-(k+1)(c^2r^2)]^{1/2}\}+Ar^4+Br^6+Cr^8$ where A, B and C are respectively quartic, sextic and octic aspherical coefficients, c is a curvature at a center of an optical surface, r is a vertical distance between a point on an aspherical curve and an optical axis, and a conic coefficient and the aspherical coefficients of the secondary mirror 2 satisfy the relational expressions of:

$9.5 \leq K \leq 11.96$ $1.22E-9 \leq A \leq 1.78E-9$ $1.10E-14 \leq B \leq 1.85E-14$ $2.20E-19 \leq C \leq 6.05E-19.$ 6. The wide-aperture spherical primary mirror off-axis afocal optical system of claim 1, wherein a field angle of the wide-aperture spherical primary mirror off-axis afocal optical system is FOV, a beam compression ratio of the wide-aperture spherical primary mirror off-axis afocal optical system is Mag, and they satisfy relational expressions of:

$0.02° \leq FOV \leq 0.1°$ $4.0 \leq Mag \leq 6.0.$

* * * * *